E. A. PRUNIER & L. HERTENBEIN.
DISH CLEANER.
APPLICATION FILED JULY 1, 1907.
1,045,079.
Patented Nov. 19, 1912.
2 SHEETS—SHEET 2.
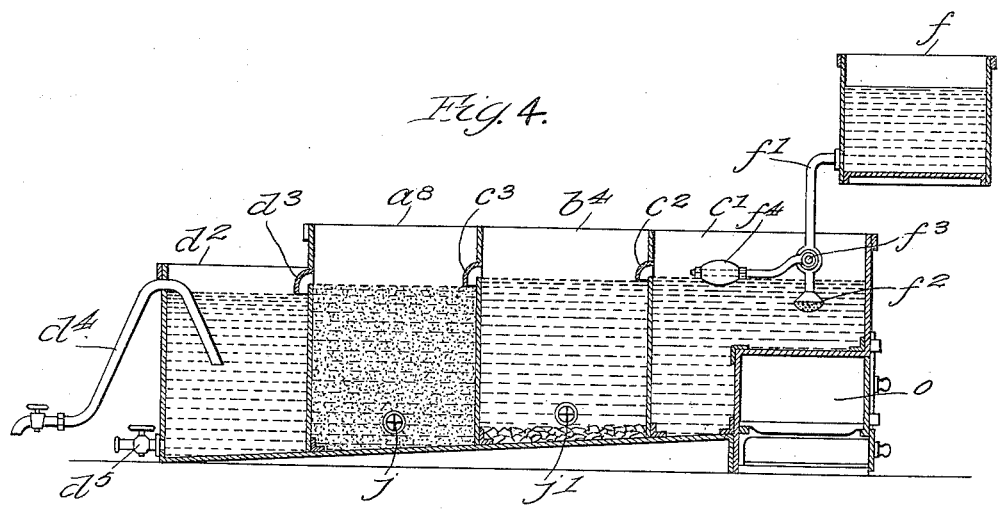

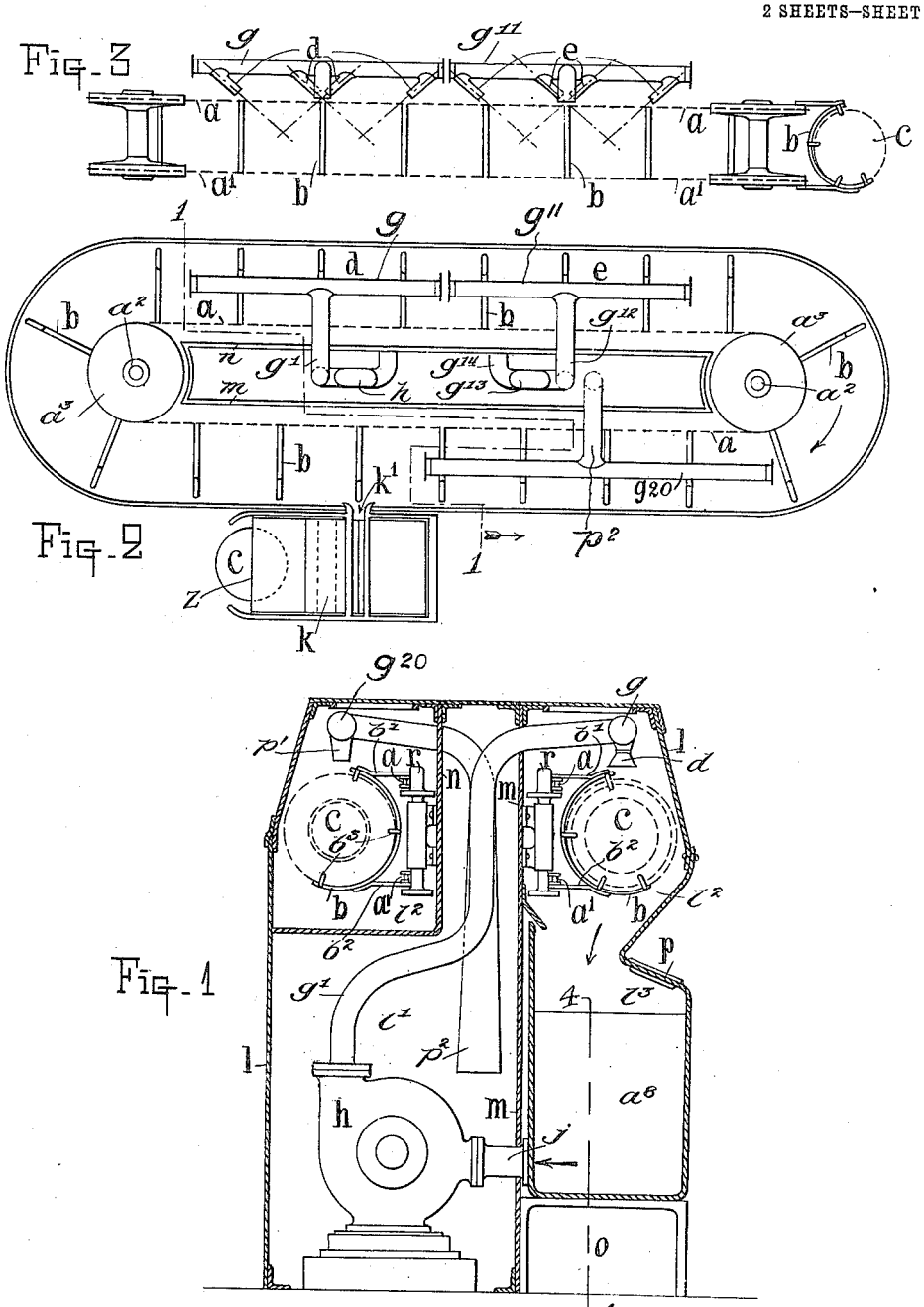

UNITED STATES PATENT OFFICE.

EMILE ALFRED PRUNIER AND LEON HERTENBEIN, OF NEUILLY, FRANCE.

DISH-CLEANER.

1,045,079.  Specification of Letters Patent.  Patented Nov. 19, 1912.

Application filed July 1, 1907. Serial No. 381,797.

*To all whom it may concern:*

Be it known that we, EMILE ALFRED PRUNIER and LEON HERTENBEIN, both citizens of the Republic of France, and residents of 95 Rue Péronnet, Neuilly, Seine, France, have invented a Dish-Cleaner, of which the following is a specification.

This invention relates to improvements in dish washing machines and consists in devices for carrying the dishes abreast of a plurality of sets of nozzles which are directed toward the moving dishes and arranged in a manner to successively wash, cleanse, rinse and dry the same.

The invention is designed to utilize liquids of different character in connection with the different sets of nozzles and devices are provided for initiating a flow of the several kinds of liquid from receptacles containing the same to and through said nozzles.

The invention will be more fully described in connection with the accompanying drawings and will be more particularly pointed ont and ascertained in and by the appended claim.

In the drawings: Figure 1 is a vertical cross-sectional view of a device embodying the main features of our invention, and taken approximately on the line 1—1 of Fig. 2. Fig. 2 is a plan view of the carrier mechanism for the dishes with the tanks omitted and illustrating the arrangement of the nozzles with respect to the carrier. Fig. 3 is a view in side-elevation of the parts shown in Fig. 2. Fig. 4 is a longitudinal sectional view on line 4—4 of Fig. 1.

Referring specifically to Figs. 1 and 2, $l$ designates a casing which is divided by partitions $n$ and $m$ into a central heating and pump chamber $l'$, carrier chamber $l^2$ and container chamber $l^3$. At oposite ends of the carrier chamber $l^2$ vertical shafts $a^2$ are provided and said shafts carry double sheaves $a^3$ about which are trained carrier chains $a$ $a'$. Said chains $a$ $a'$ are provided with upper and lower dish holder supports $b^1$ and $b^2$ which are secured to dish holders $b$ in a manner to support the same. Said dish holders $b$ consist of curved strips of metal bent to conform to and receive plates $c$ and said plates are held in place by retainers in the form of fingers $b^3$ secured to said holders $b$ and adapted to project inwardly therefrom. The chains are supported at points intermediate of the sheaves by supporting members $r$ which, as shown, are secured to the partitions $n$ and $m$. Motive power may be applied to operate the carrier chains in any desired manner.

It will be seen by reference to Fig. 2, that when the carrier chains are in motion the plates $c$ will travel in parallel relation with each other at suitable distances apart and in vertical positions throughout their path of movement. During the travel of said plates the same are subjected throughout a period of their movement to a washing action of hot water which is preferably laden with a substance adapted to facilitate the washing action but which substance need not necessarily be a washing compound. I prefer to employ saw-dust in this connection. Immediately after the washing action the plates are subjected to a cleansing treatment and for this purpose I desirably employ a suitable carbonated water. Subsequently the plates are subjected to a drying treatment of hot air to remove from the surfaces of the plates saw-dust or other particles that may have adhered thereto whereupon the dishes will be in condition to be placed upon a shelf or other repository for the dishes. The plates are inserted in the holders preferably at $k$ and they may be removed and discharged at $z$ but inasmuch as the means for inserting and withdrawing the plates may not constitute a feature of the invention such means are not herein specifically shown and described. First referring to the washing treatment, there is provided a plurality of nozzles $d$ disposed in a manner to direct the washing fluid on both surfaces of each plate. As shown said nozzles $d$ are inclined at opposing angles, two of said nozzles directing the washing fluid in a direction reverse to the travel of the plates and two of said nozzles directing the washing fluid substantially in the direction of the travel of the plates.

It will be seen by reference to Fig. 3, that as the plates move abreast of the nozzles their vertical faces will present or occupy a continuously changing position with respect to axes of the nozzles thereby insuring contact of the streams issuing from said nozzles throughout the entire areas of both sides of each plate. Referring to Fig. 3, it will be seen that the first plate advancing toward the first rearwardly directed nozzle will receive the stream issuing therefrom adjacent its lower portion and as such plate advances to a position adjacent said nozzle the stream issuing therefrom will have gradually passed across the surface of and will be directed toward upper portions of the plates. It will also be seen that as the plate recedes from the first forwardly directed nozzle the stream will engage the upper portion thereof and as the plate further recedes the stream will pass across the surface of each plate and will engage lower portions thereof thereby affording a most efficient and effective cleaning action. The nozzles $d$ are connected with a pipe $g$ which is fed by a pipe $g'$ from a pump $h$. Said pump $h$ is connected with a tank $a^8$ at $j$. It will be seen by reference to Fig. 1 that the washing fluid issuing from the nozzles $d$ will descend into the tank $a^8$ as indicated by the arrow and will be continuously re-used. A plurality of nozzles $e$ are disposed in advance of the nozzles $a$ in such a manner as to act upon the plates after the same have been washed. Said nozzles $e$ are connected with a pipe $g^{11}$ which is fed through a pipe $g^{12}$ which is connected with a pump $g^{13}$. Said pump $g^{13}$ is connected by a pipe $g^{14}$ with a tank $b^4$ at $j'$. Said tank $b^4$ contains the carbonated cleansing water with which the plates are cleansed and the nozzles $e$ are disposed in a manner to carry out the cleansing operation similarly to the washing operation.

It will be noted by reference to Fig. 2, that the pipe $g^{11}$ is located adjacent the sheave $a^3$ and I desirably utilize the time required for the plates to pass around the sheave $a^3$ to permit the dishes or plates to drain. After the plates have passed the sheave $a^3$ as indicated by the arrow they will be subjected to a drying treatment by the nozzles of the pipe $g^{20}$ which are preferably similar to the nozzles $e$ and $d$. The pipe $g^{20}$ may be provided as shown in Fig. 1 with a plurality of nozzles $p'$, the hot air being supplied through a pipe $p^2$ communicating with any suitable source of supply.

Referring to Fig. 4, the tanks $c'$, $b^4$ and $a^8$ are fed from a supply tank $f$. Said tank $f$ is provided with a discharge or delivery pipe $f'$ which as shown terminates in a rose $f^2$. A valve and float arrangement $f^3$ and $f^4$ serve to maintain the water in the tank $c'$ at a predetermined level. A suitable heating device or furnace $o$ is provided for keeping the water in the tank $c'$ at the required temperature. The carbonated water in the tank $b^4$ for cleansing the dishes is maintained at the required temperature by the water in the tank $c'$, there being a very thin partition between the two tanks. An overflow pipe $c^2$ connects the tanks $c'$ and $b^4$ and also constitutes a feed pipe for the tank $b^4$. Such impurities as may be floating on the surface of the tank $c'$ will not be taken up by the pump $g^{13}$ owing to the low position of the intake $j'$. The same is true with respect to the tank $a^8$ which also has a low outlet $j$ for the pump $h$. An overflow pipe $c^3$ connects tank $b^4$ with tank $a^8$ and carries off the floating impurities. The water in the tank $a^8$ is provided with a suitable quantity of washing material such as saw-dust. A refuse tank $d^2$ is provided adjacent the washing tank $a^8$ and is connected therewith by an overflow pipe $d^3$. A siphon discharge $d^4$ may be provided for the tank $d^2$ and also a valve outlet $d^5$, the latter being adapted for use when the tank is to be cleaned. It will be seen that the water in all of the tanks will be heated by the furnace $o$ and will be fed from the tank $f$ and that the floating impurities of tanks $b^4$ and $a^8$ will be taken off from the surface of the water contained therein and delivered to the refuse tank.

We claim:

In a dish washing machine, a carrier chamber; vertical shafts opposite the ends of the carrier chamber; double sheaves on said shafts; upper and lower carrier chains trained between said sheaves; vertical dish holders secured to said carrier chains and consisting of strips of metal suitably bent for receiving the plates and provided with inwardly projecting retaining fingers for holding the plates in the holders; supporting members for said carrier chains and engaging said chains between said sheaves; two sets of forwardly and rearwardly projecting spraying nozzles arranged above said holders; and means for forcing cleansing liquid through said nozzles.

In testimony whereof we affix our signatures in presence of two witnesses.

EMILE ALFRED PRUNIER.
LEON HERTENBEIN.

Witnesses:
　HANSON C. COXE,
　VICTOR MATREAU.